(12) United States Patent
Mikkilä

(10) Patent No.: US 6,614,807 B1
(45) Date of Patent: Sep. 2, 2003

(54) METHOD FOR DATA FLOW CONTROL BETWEEN LAYERS OF A LAYERED COMMUNICATION PROTOCOL

(75) Inventor: Petri Mikkilä, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/142,347

(22) PCT Filed: Mar. 24, 1997

(86) PCT No.: PCT/FI97/00190
§ 371 (c)(1),
(2), (4) Date: Sep. 8, 1998

(87) PCT Pub. No.: WO97/36410
PCT Pub. Date: Oct. 2, 1997

(30) Foreign Application Priority Data

Mar. 25, 1996  (FI) ................................................. 961360

(51) Int. Cl.⁷ .............................. H04J 3/22; H04L 12/28
(52) U.S. Cl. ........................................ 370/469; 370/235
(58) Field of Search ............................... 370/230–232, 370/235, 255, 466, 469, 470, 473

(56) References Cited

U.S. PATENT DOCUMENTS

| 5,007,051 A | 4/1991 | Dolkas et al. |
| 5,572,572 A | * 11/1996 | Kawan et al. ................. 379/98 |
| 5,592,627 A | 1/1997 | Burt et al. |
| 5,699,369 A | * 12/1997 | Guha ........................... 371/41 |
| 5,912,903 A | * 6/1999 | Nakayashiki et al. ......... 371/33 |

FOREIGN PATENT DOCUMENTS

EP  0 478 486  4/1992

OTHER PUBLICATIONS

A.S. Tanenbaum, *Computer Networks*, p. 148–164, 1981.
Jaakonmaki, Leena, *Lähiverko–opas* (Local Area Network Guide), Chapter 2.2.1, p. 18–19—with translation.

* cited by examiner

*Primary Examiner*—Alpus H. Hsu
*Assistant Examiner*—Toan D. Nguyen
(74) *Attorney, Agent, or Firm*—Squire, Sanders & Dempsey LLP

(57) ABSTRACT

A method for data flow control in a device using a layered communication protocol, in which method data units are transmitted asynchronously between two adjacent layers, and the data transmission rate is adjusted by controlling the transmission of data units. In order to provide a method with which if would be easy to allow for interlayer delays and buffering of primitives, the known "sliding window" method is applied in the method so that a serial number (x) is assigned to each data unit to be transmitted, and the transmitting layer maintains a transmission window (W) consisting of a variable group of serial numbers and transmits the data unit to be transmitted only if the serial number of that particular data unit is a part of said group.

5 Claims, 2 Drawing Sheets

METHOD FOR DATA FLOW CONTROL BETWEEN LAYERS OF A LAYERED COMMUNICATION PROTOCOL

FIELD OF THE INVENTION

The invention relates to a method described in the preamble of the attached claim 1 for data flow control in connection with layered communication protocols. In principle, the invention can be applied to any layered communication protocol, although it is preferably used in a system operating in accordance with the OSI model.

DESCRIPTION OF RELATED ART

The Open Systems Interconnection reference model (OSI) is a standard created by the International Standards Organization (ISO) and it describes the concepts used to define communication between computers. Systems operating in accordance with the OSI model are called open systems.

An open reference model defines the structure and functions of the communicating system. The structure is based on logical parts, i.e. layers, totalling seven, as shown in FIG. 1. The functions are divided into functions between devices on the same layer whose definitions are called protocols, and functions, or services, inside the devices between successive layers. The idea of a layered structure is that changes in one layer do not cause changes in any other layers. Hence layer specific standards may be developed independently.

An individual layer in the OSI model utilizes the services offered by a lower layer, processes them and offers its own services to upper layers. Two entities of layer (N), physically located in different devices, communicate using the protocol of that particular layer. Such entities are called peer entities.

FIG. 2 illustrates the interlayer operation in the OSI model. Entities in layer (N+1) obtain layer (N) services via layer (N) Service Access Points, (N)-SAP. Entity (N+1) may be simultaneously linked to one or more (N)-SAPs, which in turn are linked to one entity (N), i.e. only one entity of the layer is visible from one service access point.

Two peer entities in different devices communicate by exchanging data units PDU conforming with the layer (N) protocol. These units comprise Protocol Control Information, PCI, conforming with the layer (N) protocol, and layer (N) user data. Since PDUs are transferred between systems in the bit stream of the physical connection, each PDU needs a definition of its presentation as a bit string.

In transmission from layer (N+1) to layer (N), (N+1)-PDUs are disassembled (assembled in a reverse transmission direction) into (N) Service Data Units, (N)-SDU, which are transferred across the interlayer interface in layer (N) Interface Data Units (N)-IDU. An (N)-IDU comprises Interface Control Information (N)-ICI and a whole (N)-SDU or a part thereof. The interface data unit (N)-IDU is transferred via the (N)-SAP to layer (N) where it is again disassembled into a part of the (N)-SDU and ICI.

In layer (N) the (N)-SDU can be divided into one or more N-PDUs as (N) user data. If layer (N) does not disassemble the SDU obtained from layer (N+1) into several layer (N) PDUs, one layer (N) PDU corresponds to an SDU obtained from a higher layer.

The services offered by layer (N) to an upper layer are visible via the service point (N)-SAP. These interlayer services are abstract functions independent of the implementation, and called service primitives. (N) service primitives can be implemented as e.g. a group of interface data units (N)-IDU.

In the above the OSI model has been described in order to facilitate understanding the description presented below and the problem behind the invention. Since the actual invention is not associated with the OSI model proper, it will not be described in more detail here. The OSI model has been described e.g. in reference Leena Jaakonmäki: Lä hiverkko-opas, ISBN 951-762-159-0, chapter 2.2.1, where the reader may find a more detailed description of the subject matter.

Most protocol layer service interfaces of the OSI or any other layer model do not define the mechanisms for controlling the flow of SDUs across the service interface. That is, neither the user of the service nor its provider has a defined way of refusing to receive SDUs or to limit their number. However, in most cases this function has to be implemented somehow or other (or the lack thereof has to be allowed for).

Methods used in known implementations vary widely. If there is interlayer flow control, it is usually rather primitive. As an example my be given a primitive used to notify one party that no more SDUs can be received (causing a total stop to the operation of the transmitting layer). The same or another primitive is used to notify that SDUs can again be received. This method is quite clumsy and ineffective in architectures where interlayer communication is asynchronous (i.e. the receiving layer performs buffering), and the effect of the primitive is not immediate. Known methods based on acknowledgement are also ineffective since the required acknowledgements essentially increase the amount of traffic.

SUMMARY OF THE INVENTION

It is an object of this invention to accomplish an improvement to the above drawback by providing a new kind of method for flow control in asynchronous data transmission between two successive layers. This object is achieved with the method of the invention, which is characterized by what is set forth in the characterizing part of the attached claim 1.

The idea of the invention is to apply the "sliding window" method to interlayer flow control, characterized by communication between entities of the same layer in two physically separate devices, i.e. end systems. The solution of the invention is based on the idea that, due to buffering delay, interlayer communication is similar to peer-to-peer communication inside layers if interlayer communication is asynchronous.

The solution of the invention provides an easy way to allow for interlayer delays and buffering of primitives. At the same time it is possible to use also the SDU acknowledgement mechanism, useful in e.g. memory management.

BRIEF DESCRIPTION OF THE DRAWINGS

In the following the invention and its preferred embodiments will be described in greater detail with reference to examples in accordance with FIGS. 3 and 4 in the accompanying drawings, in which.

DETAILED DESCRIPTION OF THE INVENTION

In the following, interlayer communication (N+1) and (N) is considered by means of FIGS. 3 and 4. Primitives DATA.request(data) and DATA.indication(data) are assumed to have been defined in the service interface of the layers. By using the primitive DATA.request(data), entity (N+1) can request entity (N) to transmit one data unit, and by using primitive DATA.indication(data), entity (N) can request entity (N+1) to receive one data unit.

In the following, only the flow control of DATA.request primitives will be described. For this purpose, a positive integer M is defined. Each DATA.request primitive is assigned a serial number x starting with e.g. zero, so that the serial number of each DATA.request primitive is incremented by one, modulo M, compared with that of the previous one (i.e. if the previous serial number was M−1, the next serial number is again zero).

Entity (N+1) operating as the transmitter is assigned variables A and B with zero as initial value. These variables may be assigned values from zero to the value M−1, including the latter. Variables A and B define the transmission window of entity (N+1), illustrated in FIG. 4, where the transmission window is denoted by reference W. In the Figure the transmission window circles clockwise so that A determines its starting point and B its end point (in a window whose size deviates from zero, B always precedes A). Thus, the size of the transmission window may vary constantly.

A primitive by which entity (N) informs entity (N+1) that a) entity (N) has received and processed the DATA.request primitives up to the serial number a (excluding a), and b) entity (N) can receive DATA.request primitives up to the serial number b (excluding b)

is added to the service interface.

Figure 1:
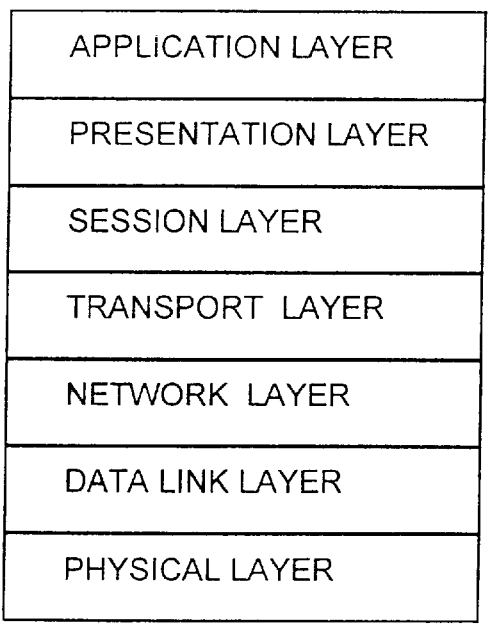
FIG. 1 illustrates the layered structure of the OSI model.
Figure 2:
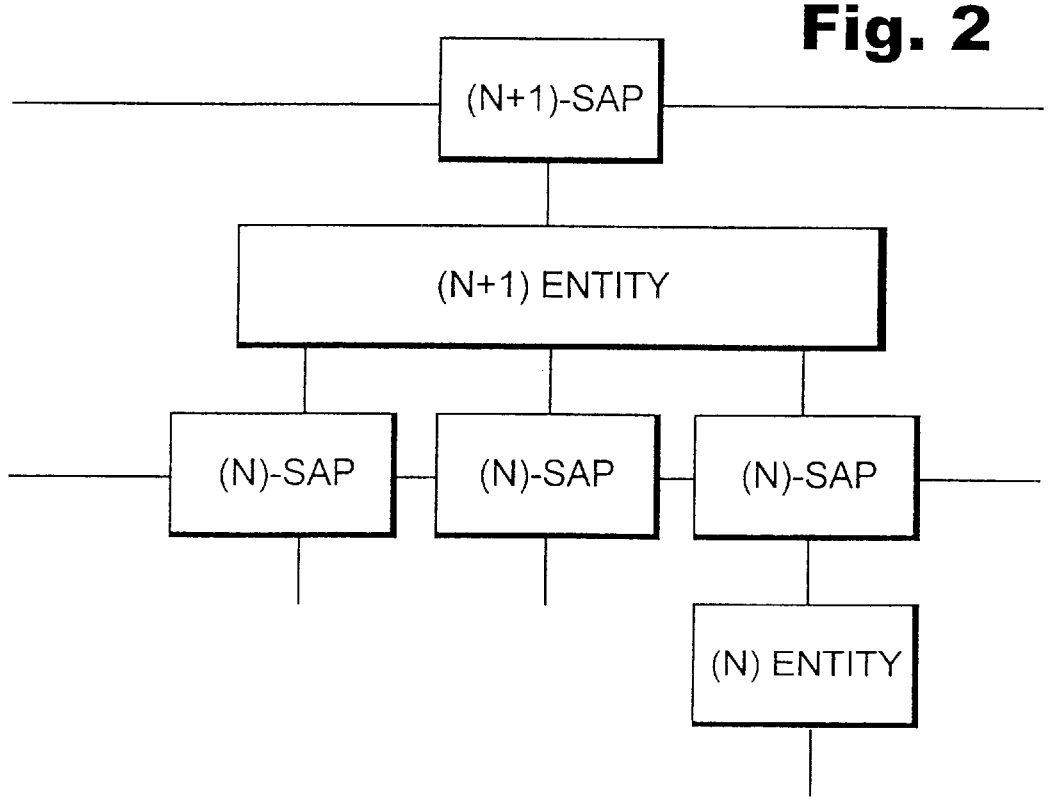
FIG. 2 illustrates the operation of a layer of the OSI model.
Figure 3:
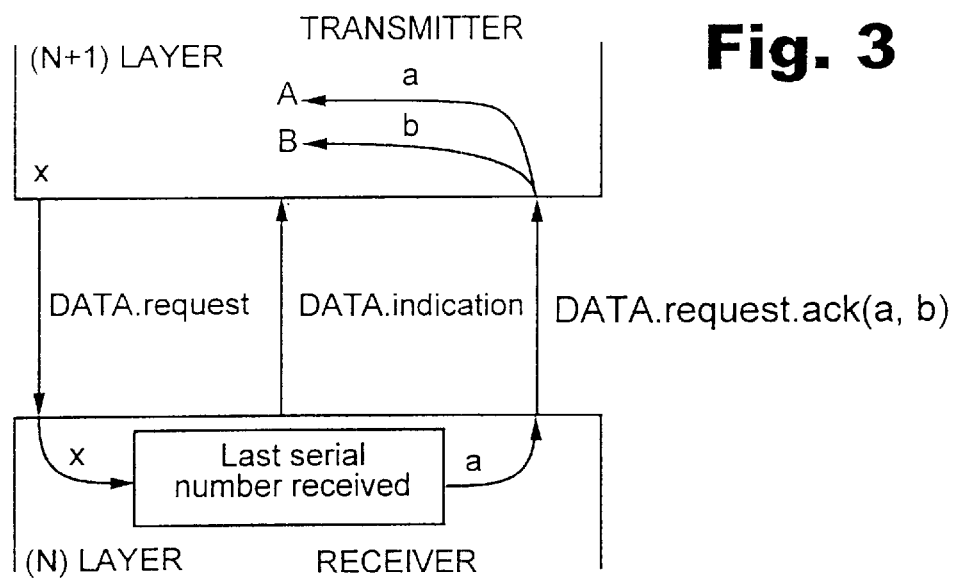
FIG. 3 illustrates the method for flow control of the invention.

In the example of FIG. 3 this primitive is denoted by reference DATA.request.ack(a,b). On receiving primitive DATA.request.ack, entity (N+1) assigns values a and b to variables A and B, i.e. parameter a directly updates variable A and parameter b directly updates variable B.

It should be noted that entity (N+1) cannot transmit any DATA.request primitive before entity (N) has increased its transmission window by the DATA.request.ack primitive by assigning at least B a value deviating from zero.

The serial number n (0≦n<M−1) of primitive DATA.request is inside the transmission window if and only if:

A≦n<B when A<B,

0≦n<B or A≦n<M when B<A, and is otherwise outside the transmission window.

Figure 4:
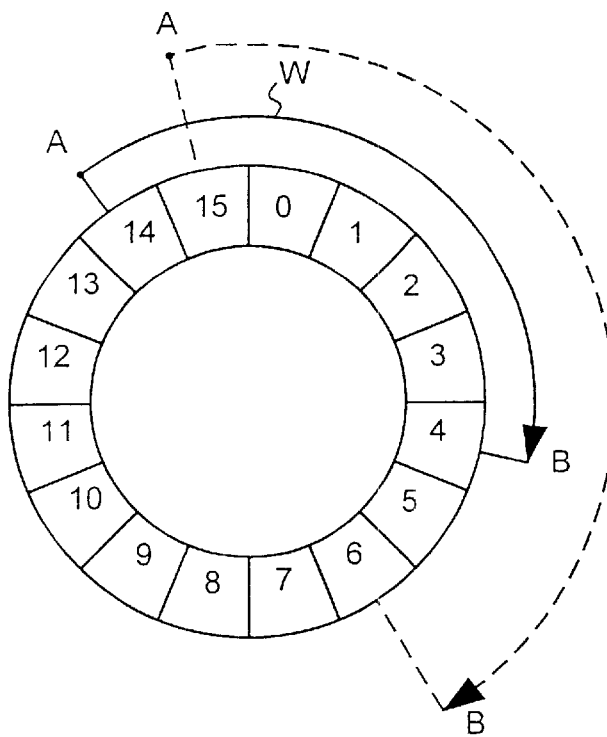
FIG. 4 illustrates the concept of a transmission window used in the method of the invention.

In the example of FIG. 4, M=16, A=14 and B=4, i.e. values 0 to 3, 14 and 15 are inside the transmission window. The Figure also shows by a dashed line a second transmission window W, created from the transmission window W in the case of the receiving layer having received one DATA.request primitive (the value of A has incremented by one) and the receiving layer having permitted the transmitting layer to transmit two new additional primitives (the value of B has been incremented by two).

One of the following always applies to the serial number x of the DATA.request primitive to be transmitted next:

a) x is inside the transmission window, and the primitive can be transmitted, or b) x=b, and the primitive cannot be transmitted.

The statuses of DATA.request primitives transmitted depend at each instant on the lower limit a of the transmission window. If the serial number of a transmitted DATA.request primitive is outside the transmission window, it is assumed that that particular primitive has been acknowledged by entity (N), and the data structures associated with it can be cleared.

Hence flow control operates in the following manner. Once the transmitting layer observes that it has data to be transmitted, it finds out the next serial number in turn. If the serial number is inside the transmission window, it is attached to the data to be transmitted and at the same time the serial number is incremented by one. Thus, the message is transmitted provided with a serial number (as the DATA.request primitive above, provided with serial number x). The receiving layer updates the information on the latest received serial number (i.e. assigns the value x to a). This value is used in the reply message until the next message is received, and then the value of a is again updated with the received value of x.

The value of parameter b transmitted by the receiving layer is dependent on the buffer space available to the receiving layer at each particular moment. Since the amount of buffer space is specific to the application, the definition of parameter b is not described in more detail here.

Flow control of DATA.indication primitives operates similarly, but the roles of entities (N) and (N+1) have been reversed since the transmission direction is reverse.

Although the invention has been described above with reference to examples in accordance with the accompanying drawings, it will be appreciated that the invention is not to be so limited, but may be modified within the scope of the inventive idea disclosed above and in the appended claims. In the above example the transmitting layer updated the starting point of the window after receiving acknowledgement from the receiving layer. It is also possible to update the starting point immediately after transmission of the message (without waiting for acknowledgement). Neither is it of any consequence to the invention whether or not the values corresponding to the starting and/or end points of the transmission window are considered to form part of the transmission window.

What is claimed is:

1. A method for data flow control in a device using a layered communication protocol, in which the method, comprises the steps of transmitting data units asynchronously between two successive layers; and adjusting a data transmission rate by controlling the transmission of data units, wherein a "sliding window" method is applied in the method, whereby a serial number is assigned to each data unit to be transmitted, and a transmitting layer maintains a transmission window consisting of a variable group of serial numbers and transmits the data unit to be transmitted only if the serial number of a particular data unit is a part of said group.

2. The method as claimed in claim 1, wherein a value constituting a starting point of the transmission window is updated by means of serial number values transmitted by a receiving layer.

3. The method as claimed in claim 1, wherein a value constituting an end point of the transmission window is updated by means of serial number values transmitted by a receiving layer.

4. The method as claimed in claim 1, wherein protocol layers conforming with the OSI model are used in the device.

5. The method as claimed in claim 2, wherein the value constituting an end point of the transmission window is updated by means of serial number values transmitted by the receiving layer.

* * * * *